United States Patent
Hongo

(10) Patent No.: US 6,532,529 B1
(45) Date of Patent: Mar. 11, 2003

(54) MICROCOMPUTER INCLUDING FLASH MEMORY OVERWRITABLE DURING OPERATION AND OPERATING METHOD THEREOF

(75) Inventor: Katsunobu Hongo, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/516,781

(22) Filed: Mar. 1, 2000

(30) Foreign Application Priority Data

Sep. 2, 1999 (JP) .......................... 11-248513

(51) Int. Cl.[7] .............................. G06F 12/00
(52) U.S. Cl. ................. 711/220; 711/103; 711/219
(58) Field of Search ............... 711/103, 163, 711/165, 173, 219, 220

(56) References Cited

U.S. PATENT DOCUMENTS

| | | | | |
|---|---|---|---|---|
| 5,010,476 A | * | 4/1991 | Davis | ......................... 711/147 |
| 5,572,695 A | * | 11/1996 | Andrews et al. | ............. 711/147 |
| 5,692,199 A | * | 11/1997 | Kikinis et al. | ............... 395/733 |
| 5,778,392 A | * | 7/1998 | Stockman et al. | ........... 707/200 |
| 6,014,714 A | * | 1/2000 | Plyler et al. | ................... 703/27 |
| 6,094,368 A | * | 7/2000 | Ching | .................... 365/185.03 |
| 6,285,890 B1 | * | 9/2001 | Panian | ........................ 455/550 |

FOREIGN PATENT DOCUMENTS

JP            8-185354            7/1996

OTHER PUBLICATIONS

"32170 Group M32170F6VFP User's Manual", Oct. 23, 1998, pp. 43–49.

* cited by examiner

Primary Examiner—Reba I. Elmore
(74) Attorney, Agent, or Firm—McDermott, Will & Emery

(57) ABSTRACT

A microcomputer includes a flash memory, a central processing unit, a plurality of storage devices, and an address predecoder. The predecoder is configured to switch between a first memory mapping and a second memory mapping and to remap certain addresses of certain storage devices to prescribed areas of the flash memory.

16 Claims, 14 Drawing Sheets

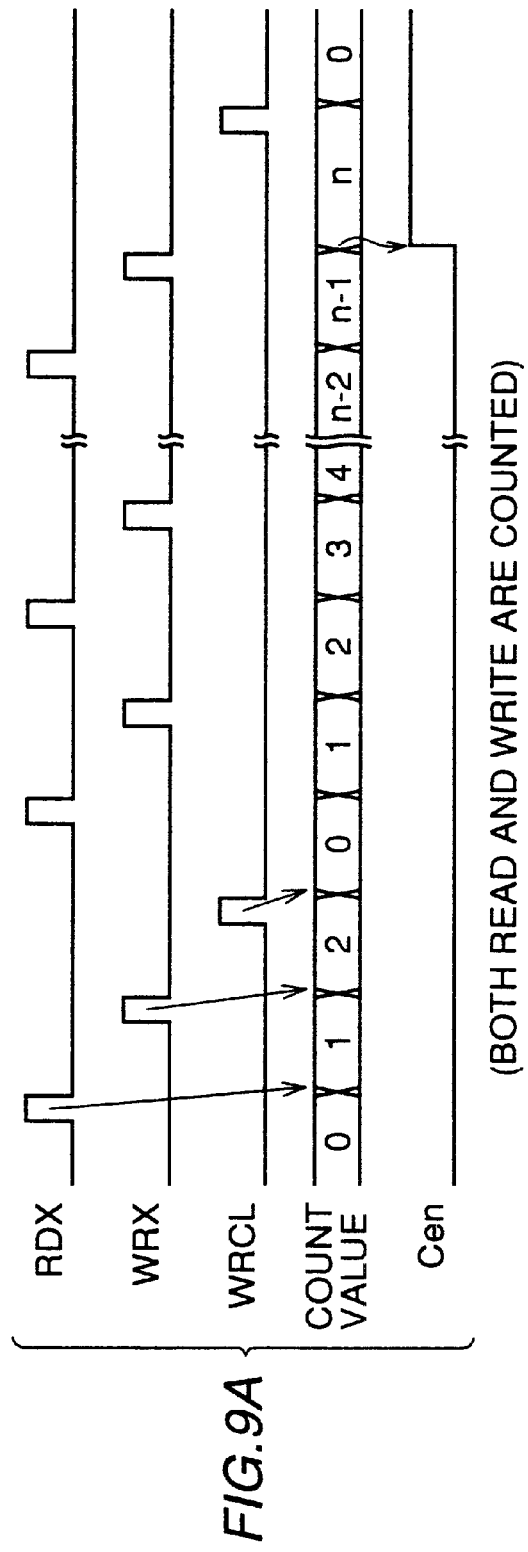
FIG.9A (BOTH READ AND WRITE ARE COUNTED)
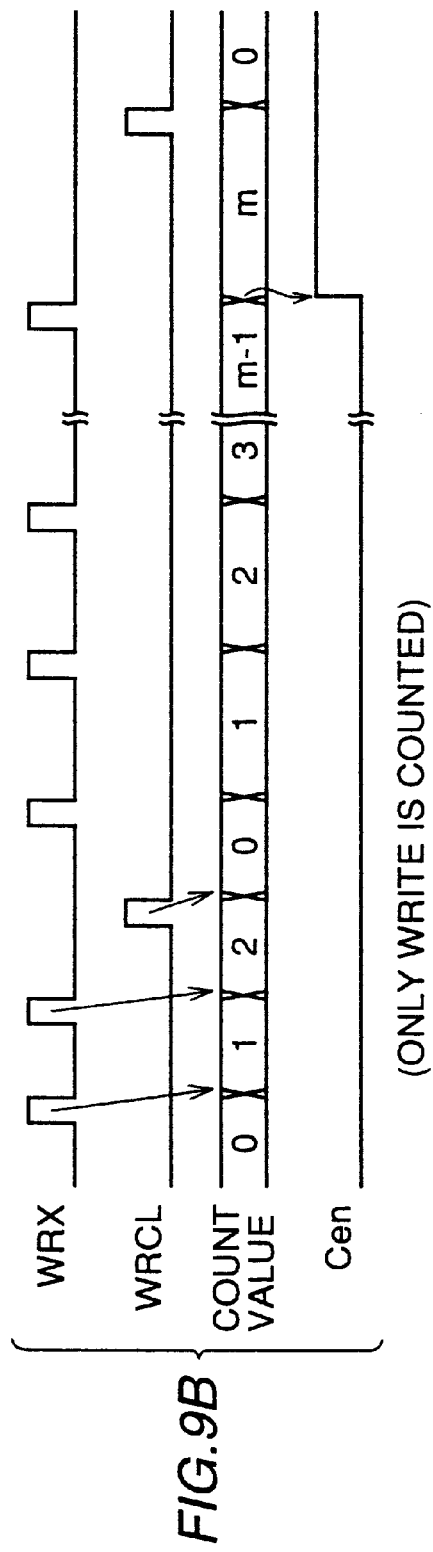
FIG.9B (ONLY WRITE IS COUNTED)

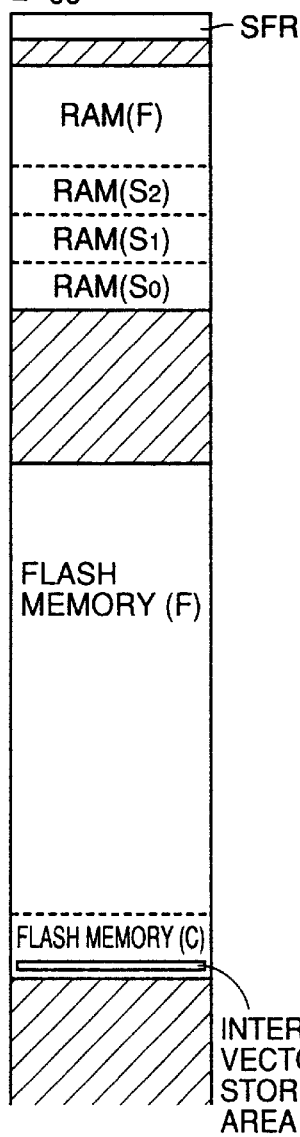

MICROCOMPUTER INCLUDING FLASH MEMORY OVERWRITABLE DURING OPERATION AND OPERATING METHOD THEREOF

BACKGROUND OF THE INVENTION

1. Field of the Invention

The present invention relates to a microcomputer including an electrically programmable erasable non-volatile memory. More specifically, the present invention relates to a microcomputer including a flash memory which allows modification/overwriting of a program stored therein in a simple manner.

2. Description of the Background Art

Recently, as personal computers have come to be widely used, various and many peripheral devices of the personal computers have also come to be used widely. Such personal devices include CD-ROM (Compact-Disk Read-Only Memory) drives, DVD-ROM (Digital Video Disk Read-Only Memory) drives and hard disk drives. These peripheral devices have characteristically short development cycles. Specifications are improved one after another and control programs are improved in a very short period of time, and therefore control programs of these devices are frequently revised. For this reason, a microcomputer including a flash memory allowing modification/overwriting of a program in a simple manner is advantageous, and hence used dominantly.

In a flash memory of such a microcomputer, a program and data including device parameters, country code and a program version number are stored. When a program is revised, or when it becomes necessary to adapt states of the device to the conditions and terms under which the device is to be used, the data are overwritten.

Referring to FIG. 1, a conventional microcomputer including a flash memory includes a flash memory 3 storing data such as program, connected to a data bus 7, an address bus 8 and read/write (RD/WR) signal line 9. The microcomputer further includes a CPU (Central Processing Unit) 1 connected to data bus 7, address bus 8 and RD/WR signal line 9 through a BIU (Bus Interface Unit) 2 for executing a program stored in flash memory 3, an external bus I/F (interface) circuit 15, an RAM (Random Access Memory) 4, peripheral devices such as a timer and a serial I/O (Input/Output), and an interrupt controlling circuit 14, which are all connected to data bus 7, address bus 8 and RD/WR signal line 9.

The microcomputer further includes an address predecoder 505 decoding an upper bit of an address applied through address bus 8 for selecting any of flash memory 3, RAM 4, peripheral device 13 and interrupt controlling circuit 14 and applying area signals ROMar, RAMar and SFRar (Special Function Register area), respectively.

Referring to FIG. 2, address predecoder 505 includes a predecoder 21 for the peripheral device 13, an RAM predecoder 22, and an ROM predecoder 23. Predecoder 21 for the peripheral device, RAM predecoder 22 and ROM predecoder 23 are all connected to address bus 8 for receiving and decoding an upper address and outputting the signals SFRar, RAMar and ROMar, respectively.

CPU 1 is capable of overwriting contents of flash memory 3. An operation mode of the microcomputer performing this process will be referred to as "flash memory overwriting mode."

Generally, CPU 1 successively reads a program written in flash memory 3 and executes the program. In the flash memory overwriting mode, however, CPU 1 cannot read data written in flash memory 3. This is because the control voltages and the states of circuit connection for performing erasure and writing of data in flash memory 3 are different in operation modes (generally referred to as "normal mode" here) other than the flash memory overwriting mode.

Therefore, in the flash memory overwriting mode, operation is controlled such that an overwrite control program is transferred in advance from flash memory 3 to RAM 4, and CPU 1 reads and executes the overwrite control program from RAM 4.

Referring to FIG. 3, the controlling structure of the program executed by the CPU in the flash memory overwriting mode is as follows. When activated, the process transfers the flash memory overwrite control program which has been stored in flash memory 3 to RAM 4 (step S110; hereinafter, "step" is not repeated). Thereafter, control jumps to that area of the RAM to which the flash memory overwrite control program has been transferred (S112). In order to successively read and execute the program on RAM 4, the overwriting mode of the flash memory is set (S114) and in S116, the flash memory is overwritten. When overwriting of the flash memory ends, the overwriting mode of the flash memory is terminated (S118).

In this manner, the contents of the flash memory are overwritten in the overwriting mode of the flash memory.

As can be seen from FIG. 1, the microcomputer includes an interrupt controlling circuit 14. When there is an interrupt request from the peripheral device 13 such a timer or a serial I/O or from a terminal input, not shown, interrupt controlling circuit 14 interrupts execution of the process program by CPU 1 and executes an interruption process. In the interruption process, CPU 1 jumps to that address which is designated by a value stored in an address referred to as "interrupt vector" existing in flash memory 3, and executes a program at that address, so that a process corresponding to the cause of interruption takes place.

More specifically, when there is an interruption, interrupt controlling circuit 14 automatically outputs an address of the interrupt vector to address bus 8. CPU 1 receives this address, and reads an area designated by the address in flash memory 3, that is, the value of the interrupt vector. Then, CPU 1 jumps to the address designated by the value. The above described series of processes are performed.

The interrupt vector area is generally in flash memory 3 from the following reason. Generally, information which must be held permanently such as the program and the interrupt vector is stored in flash memory 3. If the interrupt vector area were placed in RAM 4, it would become necessary to transfer the data of the interrupt vector to RAM 4 from flash memory 3 immediately after every activation of the microcomputer, as RAM 4 is volatile. In that case, however, interruption is not available if there is an interruption request in a period after reset termination until completion of data transfer of the interrupt vector to the RAM. Therefore, the interrupt vector is generally placed in flash memory 3.

These results in the following problem in the flash memory overwriting mode. Assume that an interruption request is issued while a process in the flash memory overwriting mode described above is being performed by executing the program stored in RAM 4. Here, CPU 1 always tries to read the interrupt vector of flash memory 3. Flash memory 3, however, is being overwritten, and therefore the result of such reading cannot be guaranteed.

In order to avoid such a problem, an interruption is inhibited while the flash memory is being overwritten, by the specification of the microcomputer. More specifically, when such an interruption occurs, the operation is not guaranteed, or alternatively, a mechanism is provided to prevent occurrence of an interruption, by hardware, in the flash memory overwriting mode.

As described above, in a microcomputer including a flash memory of the prior art, interruption is not available while the flash memory is under the overwriting operation. In recent equipments using microcomputers, a process referred to as background operation (BGO) is frequently performed. The BGO function refers to overwriting of data in a certain block within a flash memory while performing normal processing. The function is necessary for overwriting telephone books of cellular phones, overwriting of operational modes, channels, set temperature and other ambient conditions of home use and civil equipments, for example. If the interruption process is not available as in the microcomputer including a flash memory of the prior art, such BGO function cannot be attained.

A possible approach for this problem may be to include two independent flash memories. This approach is impractical as the necessary layout area is too large. An EEPROM (Electrically Erasable ROM) may be included in the microcomputer. The EEPROM, however, is manufactured through a process different from that of the flash memory, and as a result, the overall manufacturing steps of the microcomputer increases, resulting in increased manufacturing cost. Therefore, this approach is impractical.

Another approach is disclosed in Japanese Patent Laying-Open No. 8-185354. In a memory management unit described in this laid-open application, contents of a non-volatile memory are transferred to a random access memory (RAM) when the contents of the non-volatile memory are to be overwritten, and an address of the RAM is exchanged with the address of the non-volatile memory. In this manner, when an interruption occurs while the non-volatile memory is being overwritten, not the non-volatile memory but the RAM is accessed to read the interrupt vector. Thus, a correct interrupt handler can be called.

The technique disclosed in Japanese Patent Laying-Open No. 8-185354, however, still has a problem that even when the interrupt handler is correctly called, subsequent interruption cannot correctly be processed. When the interrupt handler processes an interruption, generally, the RAM is used for saving a stack and for holding operation data. In this case, however, the addresses of the non-volatile memory and the RAM have been exchanged, and therefore, if the interrupt handler were to operate in the normal manner, the non-volatile memory would be used for holding such data. Such an operation, however, is not available generally. Considering such a situation, it may be possible to prepare the interrupt handler such that it always accesses RAM. Preparation of a program in which addresses to be accessed are changed dependent on the situation require formidable time and labor, and hence such an approach is impractical. The necessary cost increases while program reliability may be impaired.

SUMMARY OF THE INVENTION

Therefore, an object of the present invention is to implement the BGO function while suppressing increase in cost, in a microcomputer including a flash memory.

Another object of the present invention is to implement the BGO function with high reliability while suppressing increase in cost, in a microcomputer including a flash memory.

The microcomputer including a flash memory in accordance with the present invention includes: a central processing unit; a plurality of storage devices coupled to the central processing unit including a flash memory and address-designated by the central processing unit independently from each other; and an address predecoder connected to receive an address signal from the central processing unit, switching memory mapping between a first memory mapping and a second memory mapping in accordance with memory mapping designating information designating the first memory mapping and the second memory mapping in which at least an address of a prescribed area of the plurality of storage devices different from the flash memory is remapped to a specific area of said flash memory, for the plurality of storage devices, and controlling an access enable mode to the specific area of the flash memory and to the prescribed area of the plurality of storage devices.

The first memory mapping and the second memory mapping are switched in accordance with the memory mapping designating information. As addresses of the prescribed area of the plurality of the storage devices different from the flash memory are remapped to a specific area of the flash memory, the prescribed area is accessed when there is an access to an address of the flash memory while the flash memory is being overwritten. Therefore, even when the flash memory is being overwritten, processing such as an interruption can be handled. Further, as the access enable mode for the prescribed area of the plurality of storage devices and the specific area of the flash memory at this time is controlled by the address predecoder, there is no contradiction even when there is an access directly designating an address of the prescribed area.

Preferably, the address predecoder includes: a storing unit storing the memory mapping designating information; a predecoder for an upper address, connected to upper bits of an address signal from the central processing unit, decoding the upper bits of the address signal and outputting respective selecting signals to the plurality of storage devices, the prescribed area of the plurality of storage devices and specific area of the flash memory; and a logic circuit connected to receive the selection signal output from the predecoder for the upper address and to receive the memory mapping designating information, and adapted to enable replacement of the selection signal for the prescribed area with the selection signal for the specific area, in accordance with a value of the memory mapping designating information.

When the selection signal for the specific area of the flash memory is generated, the selection signal for the prescribed area of another storage device is replaced by the generated signal. As a result, when there is an access to the specific area of the flash memory, actually, an access is made to the prescribed area of another storage device.

According to another aspect of the present invention, the method of operating a microcomputer including a flash memory includes the steps of: transferring data of a first specific area of the flash memory to a first prescribed area of another storage device; remapping the addresses of the first prescribed area to the first specific area; transferring data of a second specific area of the flash memory to a second prescribed area of another storage device as needed; and after transfer of the data of the second specific area, remapping the addresses of the second prescribed area to the second specific area.

Among the data of the flash memory, only those necessary are copied to the prescribed area of another storage device and the addresses are remapped, and when copying of further data is necessary, the data is copied to a still another area and the addresses are remapped. When the data of the flash memory are transferred to another storage device and the flash memory is controlled using the transferred data, it is possible to use an area only of an appropriate size of another storage device.

According to a still further aspect of the present invention, the method of operating a microcomputer including a flash memory includes the steps of: transferring data of a first specific area of the flash memory to first and second prescribed areas of another storage device, updating the data transferred to the first and second prescribed areas with different data; and remapping the addresses of the first or the second prescribed area to the first specific area, in accordance with operation condition of the microcomputer including a flash memory.

The addresses of the first or the second prescribed area can be remaped to the first specific area. Therefore, when the data stored in these areas are updated to data allowing optimal operation of the microcomputer including a flash memory under different conditions and remapping the addresses of the first or the second prescribed area by selecting either of these, the flash memory can be controlled such that overwriting of the flash memory is done with a program optimally operating under the selected condition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B are timing charts representing an operation of a counter of the microcomputer in accordance with the second embodiment.

FIGS. 12A to 12D show memory mappings of the microcomputer in accordance with the third embodiment.

DESCRIPTION OF THE PREFERRED EMBODIMENTS

First Embodiment

Figure 1:
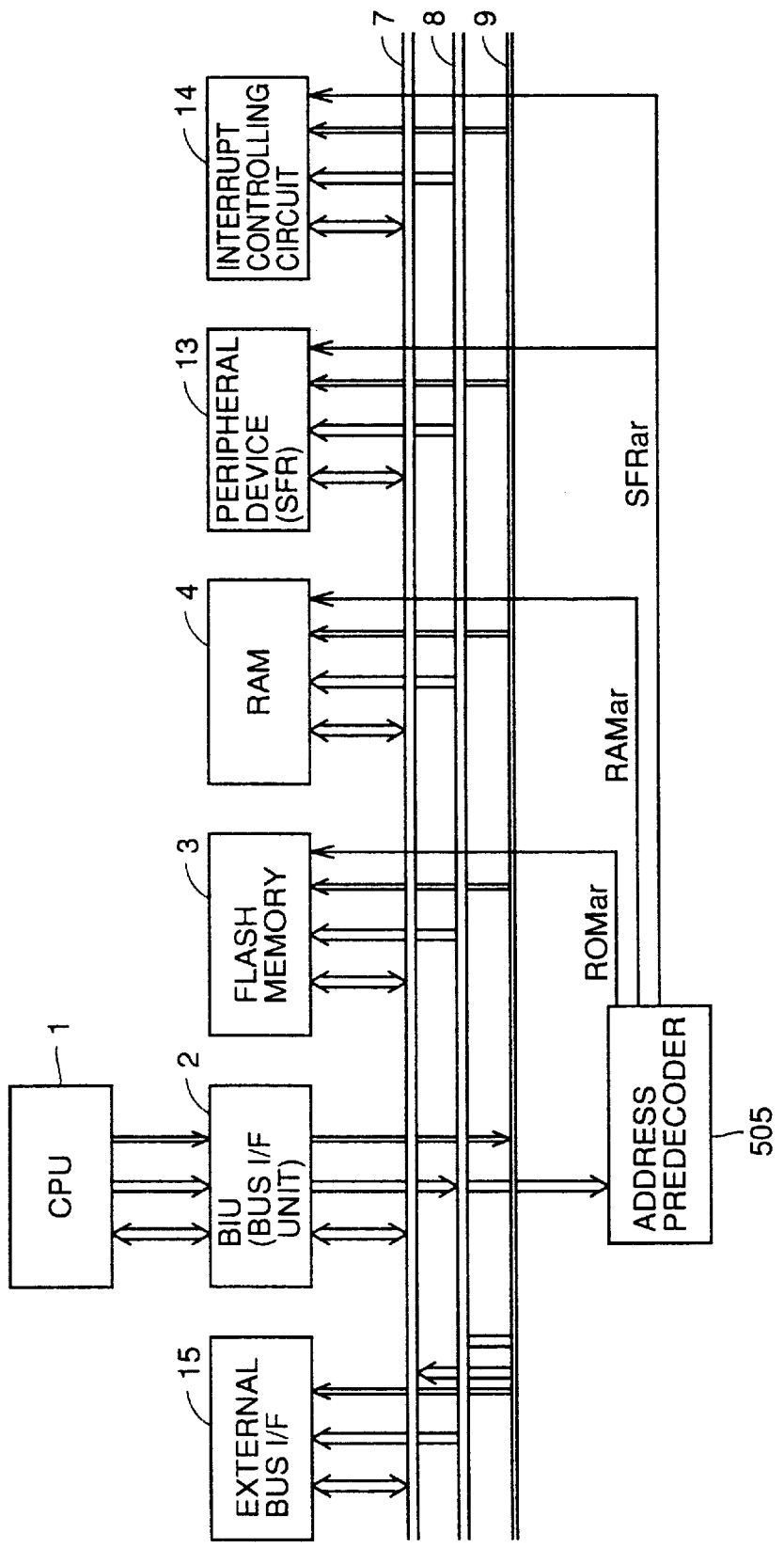
FIG. 1 is a block diagram of a conventional microcomputer.
Figure 2:
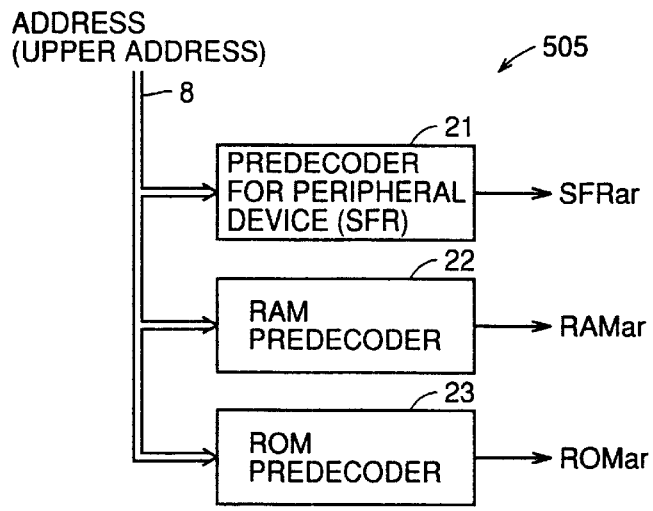
FIG. 2 is a block diagram of an address predecoder of the conventional microcomputer.
Figure 3:
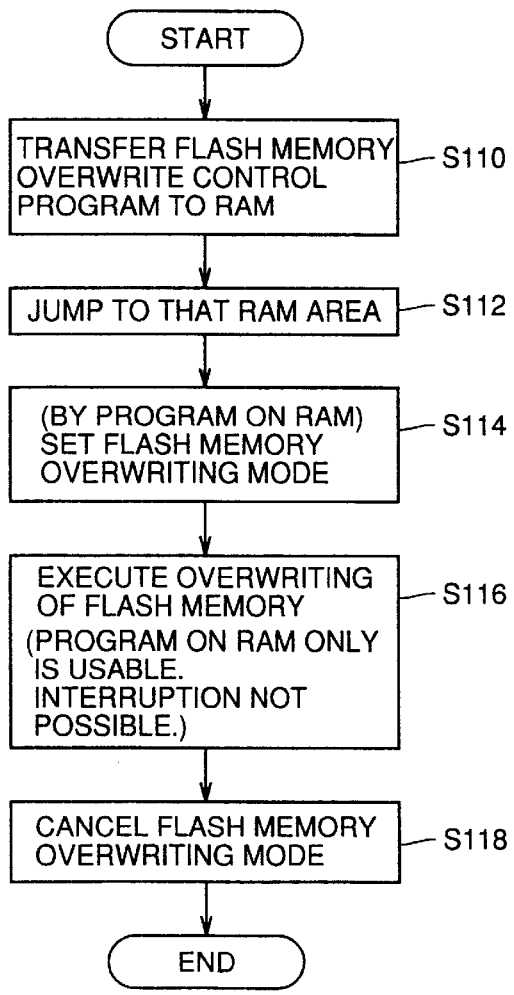
FIG. 3 is a flow chart representing an operation when the flash memory is overwritten, in the conventional microcomputer.
Figure 4:
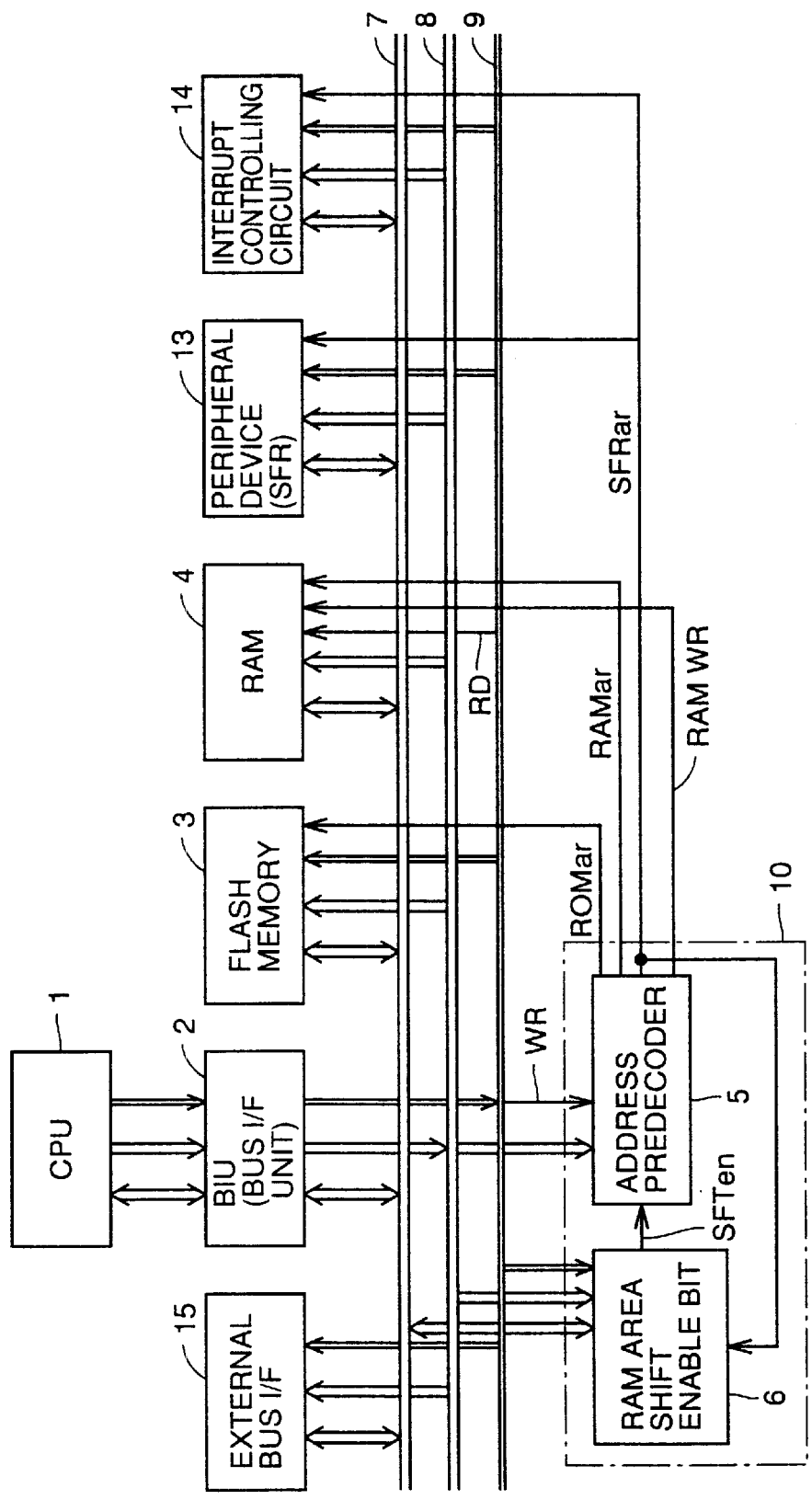
FIG. 4 is a block diagram of a microcomputer in accordance with a first embodiment of the present invention.

Referring to FIG. 4, the microcomputer including a flash memory in accordance with the first embodiment of the present invention includes a flash memory 3, an RAM 4, a peripheral device 13, an interrupt controlling circuit 14 and an external bus I/F circuit 15, which are all connected to data bus 7, address bus 8 and RD/WR signal line 9. In the following description, portions corresponding to those of FIGS. 1 and 2 will be denoted by the same reference characters. Names and functions are also the same. Therefore, detailed description thereof will not be repeated in the following.

In the following description, when one area is "shifted" to another area, it means that the addresses of the one area are remapped to the another area.

The microcomputer further includes a CPU 1 connected to data bus 7, address bus 8 and RD/WR signal line 9, and which controls read/write from and to the memory through a BIU (Bus Interface Unit) 2 for executing a program stored in flash memory 3. The microcomputer also includes an improved predecoder 10 having RAM area shifting function for decoding upper bits of an address applied through address bus 8. The predecoder is configured to select any of flash memory 3, RAM 4, peripheral device 13 and interrupt controlling circuit 14 and is configured to apply area signals ROMar, RAMar and SFRar thereto, respectively. The predecoder is configured to select a prescribed area of RAM 4 instead of a specific area of flash memory 3 in a specific situation. Predecoder 10 with RAM area shifting function also has a function of outputting a RAM write control signal RAM WR to RAM 4 for controlling writing to RAM 4, so as to control write enable mode of RAM 4.

Figure 5:
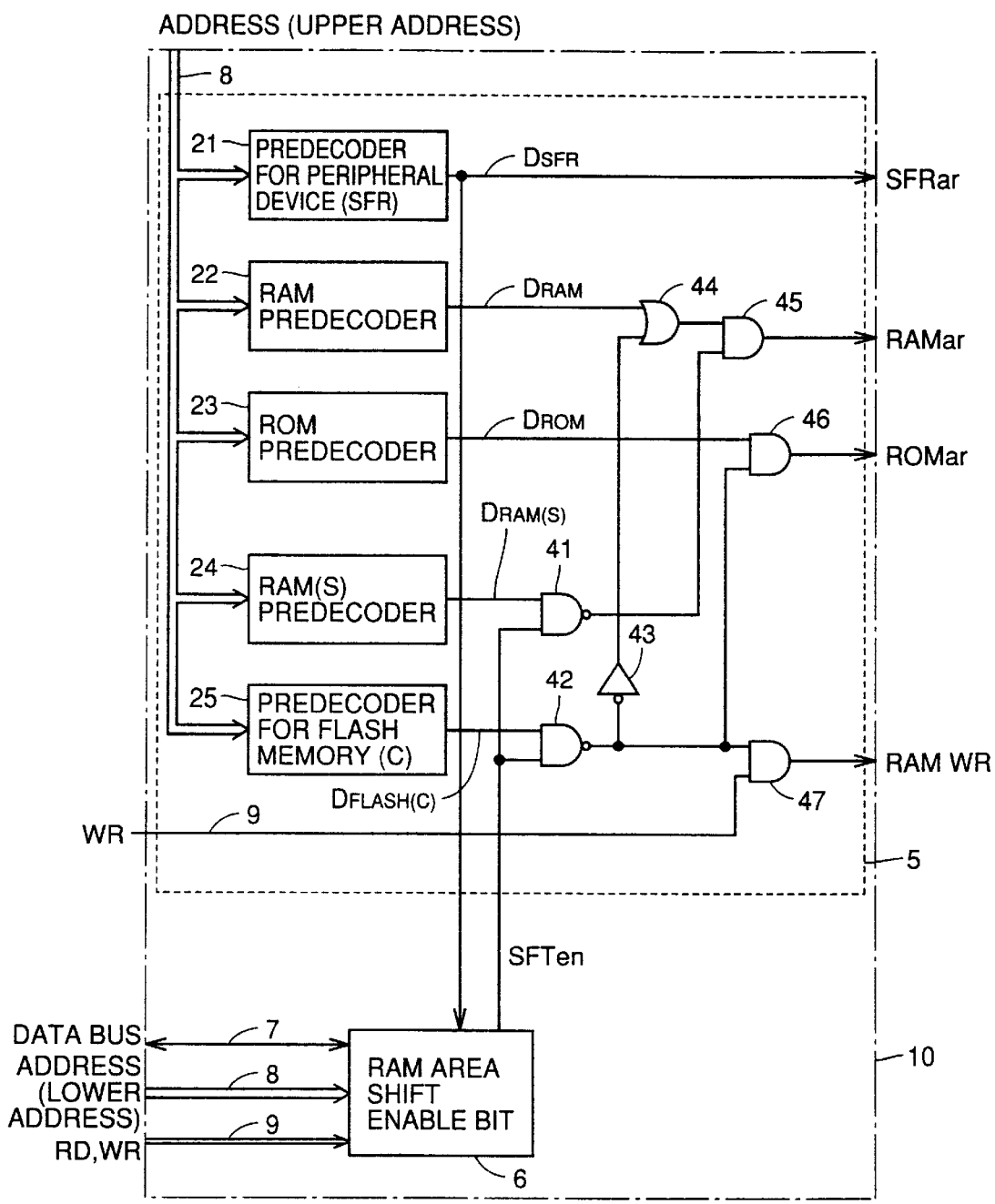
FIG. 5 is a block diagram of an address predecoder and related portions of the microcomputer in accordance with the first embodiment.

Referring to FIG. 5, predecoder 10 with RAM area shifting function includes a RAM area shift enable bit 6 connected to data bus 7, address bus 8 and RD/WR signal line 9 and is configured to store information for designating memory mapping of the microcomputer. The predecoder also includes an address predecoder 5 responsive to an address signal applied from address bus 8, write control signal WR applied from RD/WR signal line 9, and contents of RAM area shift enable bit 6. The RAM area shift enable bit 6 outputs ROM area signal ROMar, RAM area signal RAMar, RAM write control signal RAM WR, and SFR area signal SFRar to flash memory 3, RAM 4, peripheral device 13 and interrupt controlling circuit 14, respectively. An initial value after reset of RAM area shift enable bit 6 is set to "0". The value of RAM area shift enable bit 6 can be overwritten by designating the address of RAM area shift enable bit 6 by address bus 8 and outputting desired data to data bus 7.

In addition to the predecoder 21 for peripheral device, RAM predecoder 22 and ROM predecoder 23, which is described with respect to the prior art, address predecoder 5 includes: a predecoder 24 for RAM(S), responsive to the designation by an upper address of a specific shift area (hereinafter referred to as "RAM(S) area") to which at least an area including interrupt vector of flash memory 3

(hereinafter referred to as "flash memory (C) area") is shifted, for outputting a DRAM(S) signal to select RAM 4; and a predecoder 25 for flash memory (C) connected to address bus 8 and outputting, when the flash memory (C) area is designated by an upper address, a signal DFLASH (C) for selecting that area. Of the flash memory 3, an area which is not moved to RAM 4 will be referred to as "flash memory (F) area" in the present specification.

Address predecoder 5 further includes: a NAND gate 41 receiving the output signal DRAM(S) of RAM(S) predecoder 24 and the RAM area shift enable bit 6; a NAND gate 42 receiving the output signal DFLASH (C) of flash memory (C) predecoder 25 and the RAM area shift enable bit 6; an inverting circuit 43 having an input receiving an output from NAND gate 42; an OR gate 44 receiving at its inputs the output signal DRAM of RAm predecoder 22 and an output of inverting circuit 43; an AND gate 45 receiving outputs of OR gate 44 and NAND gate 41; a NAND gate 46 receiving at its inputs the output signal DROM of ROM predecoder 23 and an output of NAND gate 42; and an AND gate 47 receiving the output of NAND gate 42 and a signal on RD/WR signal line 9.

The output signal DSFR of predecoder 21 for the peripheral device is coupled to SFR area signal SFRar. The output signal DSFR of predecoder 21 for the peripheral device is also applied to the RAM area shift enable bit 6.

The output of AND gate 45 is coupled to RAM area signal RAMar. The output of AND gate 46 is coupled to ROM area signal ROMar. The output of AND gate 47 is coupled to RAM write control signal RAM WR.

Table 1 below represents relations between addresses (output from BIU 2) input to address predecoder 5 and output signals of address predecoder 5.

is accessible (read, write). Therefore, in FIG. 6A, the RAM (S) area is represented by its name, while in FIG. 6B, the area is represented as a read unable and write unable area.

Now, assume that flash memory (C) area is accessed. When RAM area shift enable bit 6 is "0", it corresponds to FIG. 6A, so that ROM area signal ROMar is rendered active, allowing reading from flash memory (C) and overwriting in the flash memory overwriting mode. When the RAM area shift enable bit 6 is "1", it corresponds to FIG. 6B, in which only the RAM area signal RAMar is active. Flash memory (C) area is not readable, and RAM(S) area is not writable as RAM write control signal RAM WR is not output. Therefore, reading of RAM(S) area only is possible. Thus access mode of flash memory 3 and RAM 4 is controlled.

Figure 6:
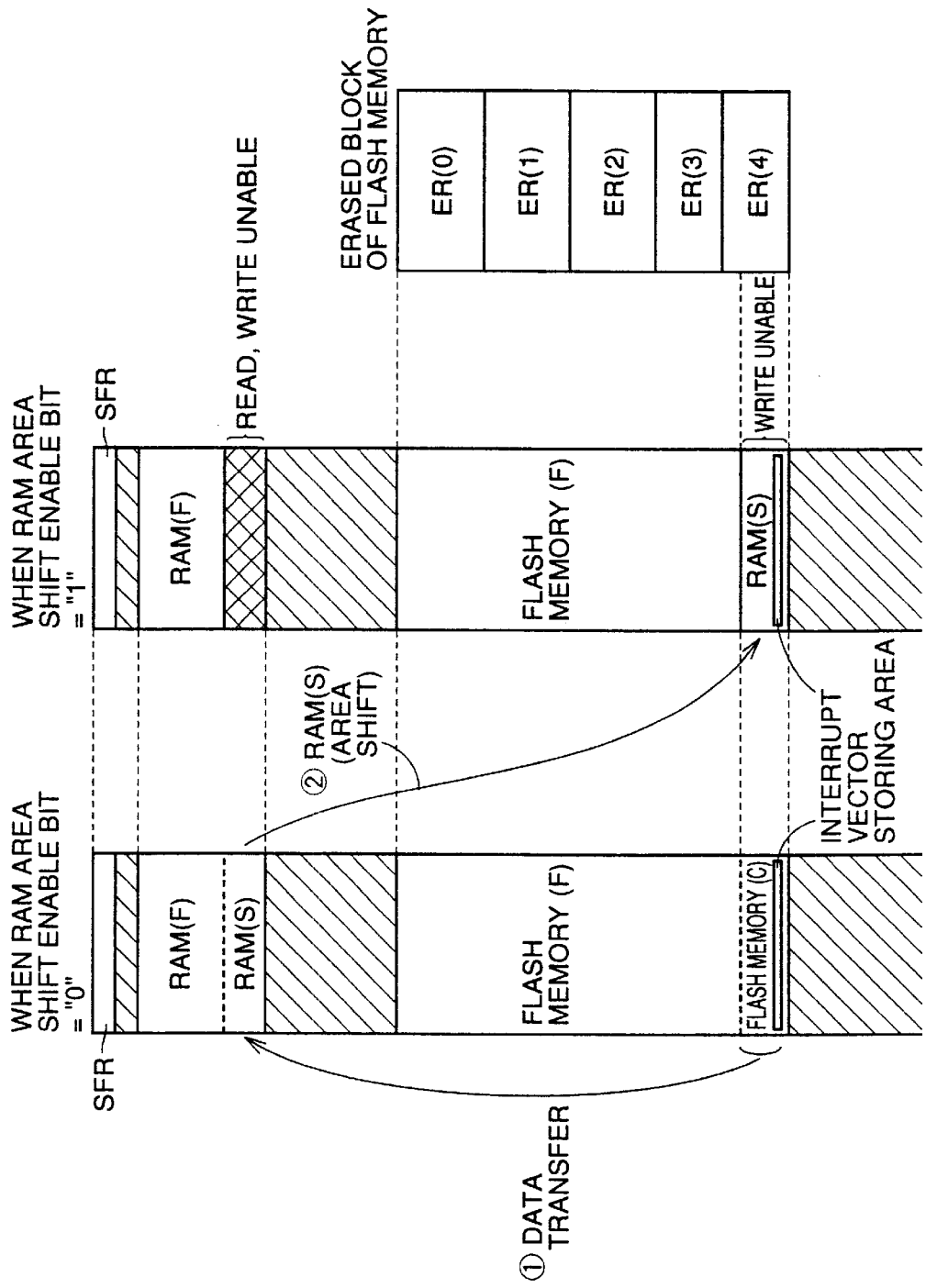
FIGS. 6A to 6C show memory mappings of the microcomputer in accordance with the first embodiment.

As the address predecoder 5 is structured as above, it is possible to select either of the two different memory mappings of FIGS. 6A and 6B dependent on the state ("0" or "1") of RAM area shift enable bit 6. FIG. 6C represents that there are a plurality of erase blocks of flash memory as shown by ER (0) to (4), and FIGS. 6A, 6B and 6C represent that of block ER (4), a local area (flash memory (C) area) including interrupt vector storing area is the object of the shifting described above.

An operation when the contents of the flash memory are changed while CPU 1 is in operation in the microcomputer will be described with reference to FIG. 7.

First, as initialization after reset, data in flash memory (C) area are transferred to RAM(S) area in step (hereinafter simply denoted by "S") 10. By this time, the memory mapping is the first memory mapping shown in FIG. 6A.

Thereafter, the RAM area shift enable bit 6 is set to "1". Consequently, RAM(S) area is shifted onto flash memory (C) area, implementing the second memory mapping shown

TABLE 1

| Designated Address | Internal Signal of Address Predecoder 5 Which Is Rendered Active | Output Signal of Address Predecoder 5 Which Is Rendered Active | |
|---|---|---|---|
| | | RAM area shift enable bit 6 = "0" | RAM area shift enable bit 6 = "1" |
| SFR | DSFR (21 output) | SFRar (RAM WR*) | SFRar (RAM WR*) |
| RAM(F) | DRAM (22 output) | RAMar, RAM WR* | RAMar, RAM WR* |
| RAM(S) | DRAM (22 output) DRAM(S) (24 output) | RAMar, RAM WR* | None (RAM WR*) |
| Flash Memory (F) | DROM (23 output) | ROMar (RAM WR*) | ROMar (RAM WR*) |
| Flash Memory (C) | DROM (23 output) DFLASH (C) (25 output) | ROMar (RAM WR*) | RAMar |
| Others | None | None (RAM WR*) | None (RAM WR*) |

In Table 1, the RAM WR signal is output only in that period in which write signal WR is active.

Referring to Table 1 and FIGS. 6A to 6C representing memory mappings of the device in accordance with the first embodiment, when the SFR area (peripheral device) is accessed, the SFR area signal SFRar is output, regardless of the state of RAM area shift enable bit 6.

When the RAM(S) area is accessed and RAM area shift enable bit 6 is "0", it corresponds to FIG. 6A, and RAM area signal RAMar and the RAM write control signal RAM WR are rendered active. When the RAM area shift enable bit 6 is "1", on the other hand, it corresponds to FIG. 6B, in which no signal is rendered active, and therefore none of the areas in FIG. 6B. More specifically, when the flash memory (C) area is address-designated, actually the RAM(S) area is accessed. An access of the original RAM(S) area is rendered inaccessible. Therefore, when an address of the original (FIG. 6A) flash memory (C) is read while a normal processing is in progress or an interruption is in progress, not the flash memory but the RAM(S) is read, thus the interrupt vector is read correctly. Even when there is an attempt to write to the RAM(S) area because of a program error, for example, the RAM write control signal RAM WR is not output, and therefore writing cannot be executed. Therefore, there is no possibility that the data in the RAM(S) is destroyed.

The process following the initialization will be described. First, whether the flash memory is to be overwritten or not is determined (S14). This determination is made in this step by determining whether all the conditions for overwriting the flash memory are satisfied. The conditions for determination vary dependent on the applied device, and therefore, details thereof will not be discussed here. When it is determined that the conditions for overwriting the flash memory are satisfied, the control proceeds to S18, and when not, control proceeds to S16.

A case where the flash memory is not overwritten will be described first. In S16, a normal process routine is executed. The normal process routine refers to a routine for general processing for controlling the applied device. In the normal process routine, the programs in the shifted RAM(S) and the flash memory (F) area can be used. As the interrupt vector has been shifted to the RAM(S) area, interruption is also possible. When the normal process routine ends, control again returns to S14 and the following control is repeated.

When it is determined in S14 that the conditions for overwriting the flash memory are satisfied, a process for setting flash memory overwriting mode takes place in S18. This is set by writing, for example, data "1" to the mode selection bit of a specific register, not shown.

Thereafter, the flash memory is overwritten by executing a program in RAM(S) (S20). Overwriting of the flash memory is executed by an appropriate processing performed by the CPU in accordance with a protocol determined by flash memory 3 used, for example, by writing a specific data to the flash memory overwrite control register, or by an issuance of a flash memory control command (erase command, write command, read command or the like).

When this process ends, a process for terminating the flash memory overwriting mode is performed (S22). More specifically, this is executed by writing data "0", for example, to the mode selection bit mentioned above.

It is possible that an interrupt request is issued during the process of S20. In that case, execution of the program of the overwriting process is interrupted at an interruptible portion, and the interrupt process is executed by a program which is also in the RAM(S). There may be a process routine which must not be interrupted during overwriting. In that case, the interruption is inhibited by software while the routine is being executed, and interruption is allowed after the end of the routine.

In order to enable execution of an interruption, however, it is necessary to set a destination address of jumping designated by the interrupt vector within the RAM(S) and to complete at least the interruption in the flash memory overwriting mode within the program in RAM(S).

The normal process routine including checking of a specific input terminal, checking of an operation state of the peripheral device and generation and output of control signals which can be normally output may be executed at intervals of the flash memory overwriting process appropriately, by using a program on the RAM(S). In that case, however, it is also necessary that such process program is complete within the RAM(S).

As described above, by the microcomputer in accordance with the first embodiment, even when the flash memory is being overwritten, some process routine of the microcomputer can be performed, complete in the RAM(S). Though the program within the fixed (flash memory (F)) area of the flash memory cannot be used in this period, the overwriting process (BGO) of the flash memory is possible without interrupting unnecessary process and without excessively increasing the circuitry and the cost.

Further, after the RAM area shift enable bit 6 is set to "1" and the RAM(S) area is shifted, writing to the RAM(S) area is impossible. Therefore, even when there is an attempt to write to the RAM(S) area because of a program error, for example, writing does not actually takes place, and hence destruction of data can be prevented. In summary, in the first embodiment, a local area of the RAM 4 is not only shifted onto the addresses of flash memory 3 but is used as if it is an ROM.

Further, when the above described function is unnecessary and the RAM area shift enable bit is erroneously written, it is possible that the RAM(S) area is undesirably shifted, resulting in malfunction of the microcomputer. In order to avoid such a problem, write protect may be implemented by writing "1" only when writing to the bit occurs twice continuously, for example.

The above description is mainly related to the operation of overwriting the flash memory. If overwriting is unnecessary, the RAM area shift enable bit 6 may be maintained at "0", and operation may be performed with the memory mapping shown in FIG. 6A as in the prior art.

Second Embodiment

In the first embodiment described above, the RAM(S) area is shifted to the flash memory (C) area simply by setting "1" at RAM area shift enable bit. Other condition may be added as a condition for shifting the RAM(S) area. The microcomputer in accordance with the second embodiment is an example.

In the microcomputer in accordance with the second embodiment, the following two conditions are ANDed for shifting the RAM(S) area.

(1) The RAM area shift enable bit is set to "1"; and
(2) flash memory overwriting mode is set.

Figure 7:
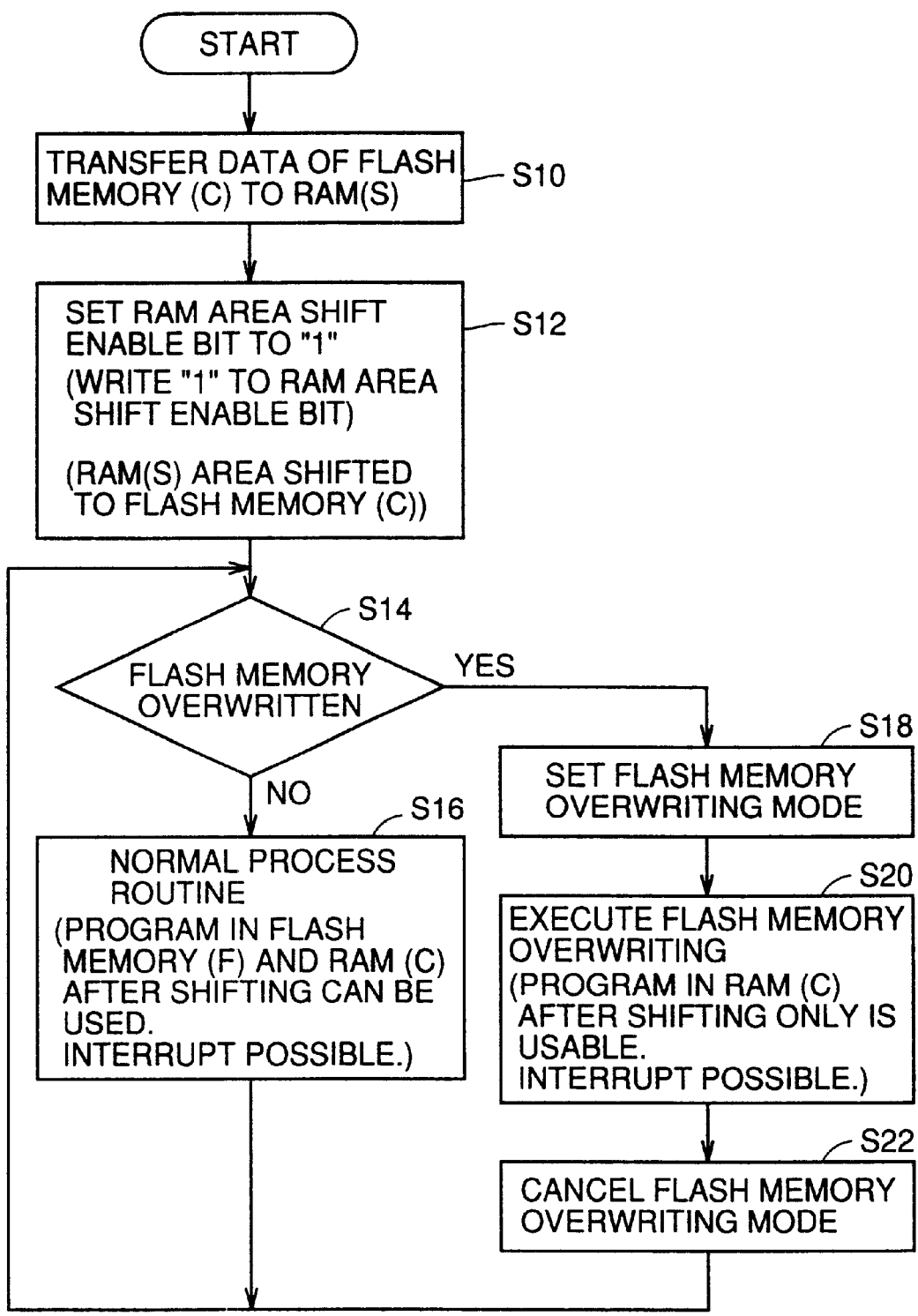
FIG. 7 is a flow chart representing an operation of the microcomputer in accordance with the first embodiment.

When these two conditions must be satisfied to shift the RAM(S) area, the flow chart of the first embodiment 1 shown in FIG. 7 is not in itself changed, except the following point. In FIG. 7, the operation "RAM(S) area shifted to flash memory (C)" is in step S12, while in the microcomputer in accordance with the second embodiment, these two conditions are satisfied in step S18, and hence the RAM(S) area is shifted to the flash memory (C) not in step S12 but in step S18.

In the microcomputer of the second embodiment, what is different from the first embodiment is only the condition of RAM shifting as described above, and operation flow is almost the same as that of the first embodiment. Therefore, further details of the microcomputer in accordance with the second embodiment will not be repeated.

Similar effects as the first embodiment can be provided by the second embodiment. Further, the second embodiment provides effects different from that of the first embodiment. More specifically, as shifting of RAM(S) area occurs in step S18, the RAM(S) area has not yet been shifted in the normal process routine of step S16 (FIG. 7). Therefore, in the normal process routine, that area of the RAM(S) area which is not used in the process of steps S18 to S22 can be used as the normal RAM area.

More specifically, when the RAM shift function is not used, both RAM(F) and RAM(S) areas can be used in the first and second embodiments. When the RAM shift function is used in the first embodiment, only the RAM(F) area can be used as the RAM area. When the RAM shift function is used in the second embodiment, the RAM area which can be used is the sum of the RAM(F) area and that portion of the RAM(S) area which is not used in the flash overwrite routine (the portion not used in the steps S18 to S22 of FIG. 7).

Therefore, larger RAM area can be used in the second embodiment than the first embodiment.

In the second embodiment, the RAM is shifted not on one condition but on an AND of two conditions. Therefore, even when there should be an erroneous writing to the RAM area shift enable bit, the RAM area is not shifted unless the operation mode is changed to the flash memory overwriting mode. Therefore, as compared with the first embodiment, the second embodiment is more advantageous in that erroneous operation can more effectively be prevented.

Third Embodiment

Figure 8:
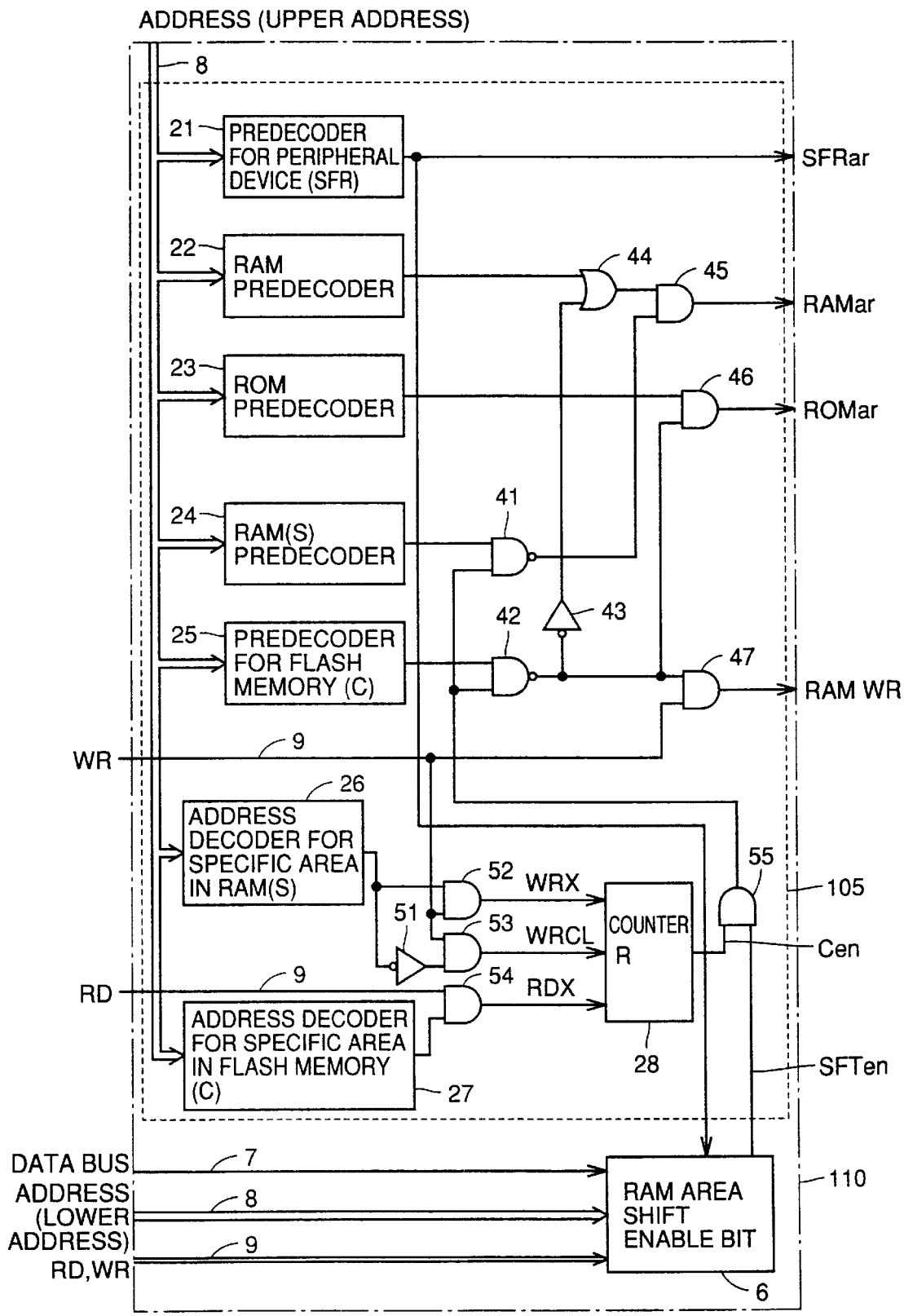
FIG. 8 is a block diagram of an address predecoder and related portions of the microcomputer in accordance with a second embodiment.

Referring to FIG. 8, a predecoder 110 having RAM area shift function of the microcomputer in accordance with the third embodiment of the present invention may be used in place of predecoder 10 having RAM area shift function in accordance with the first embodiment. In FIG. 8, portions corresponding to those of FIG. 5 are denoted by the same reference characters. Names and functions are also the same. Therefore, detailed description thereof will not be repeated here.

Referring to FIG. 8, the predecoder 110 with RAM area shift function of the microcomputer in accordance with the third embodiment includes an address predecoder 105 and RAM area shift enable bit 6.

In addition to the structure of address predecoder 5 shown in FIG. 5, address predecoder 105 includes: an address decoder 26 for a specific area of RAM(S) receiving an upper address from address bus 8 and decoding an address of the RAM(S) area corresponding to the address before shifting; an address decoder 27 for a specific area of flash memory (C) also receiving an upper address from address bus 8 and decoding an address of the specific areas of flash memory (C) corresponding to the address before shifting; an inverting circuit 51 receiving an output of address decoder 26 for the specific area of RAM(S); an AND gate 52 receiving an output of address decoder 26 for the specific area in RAM(S) and the write control signal (WR) on RD/WR signal line 9; an AND gate 53 receiving the write control signal (WR) on RD/WR signal line 9 and an output from inverting circuit 51; an AND gate 54 receiving a read control signal (RD) on RD/WR signal line 9 and an output of address decoder 27 for a specific area in flash memory (C); a counter 28 receiving an output WRX of AND gate 52 and an output RDX of AND gate 54 and counting respective pulse numbers and receiving at a reset input, an output WRCL of AND gate 53; and an AND gate 55 receiving an output Cen of counter 28 and an output SFTen of RAM area shift enable bit 6. AND gate 55 is interposed between an input of NAND gate 41 and RAM area shift enable bit 6.

Address decoder 26 for the specific area in RAM(S), address decoder 27 for a specific area in flash memory (C), counter 28 and the circuits from inverting circuit 51 to AND gate 55 are all provided for modifying the signal SFTen output from RAM area shift enable bit 6. Because of the AND gate 55, even when RAM area shift enable bit 6 is set to "1", actual RAM area is not shifted unless the output Cen of counter 28 is rendered active ("H"). The RAM(S) area is shifted only when the output Cen of counter 28 and the output STFen of RAM area shift enable bit 6 are both active.

Referring to FIGS. 9A and 9B, counter 28 operates with the following timing. FIG. 9A represents an example in which both read and write signals are counted. It is assumed that the output Cen of counter 28 is cleared when the microcomputer is reset. Counter 28 counts both the pulse of RDX which is generated when a specific area (for example, an address of the interrupt vector) within the flash memory (C) is read, and the pulse of WRX which is generated when a specific area (for example, an address of the interrupt vector) within the RAM(S) is written. When the count value of counter 28 reaches a prescribed value (represented by "n" in FIG. 9A), counter 28 fixes the output Cen at "H" (active level).

When there is a write to an area other than the specific area in the RAM(S), the pulse WRCL is output from the AND gate 53, and by this, the count value of counter 28 is cleared. Even in this case, the output Cen is not cleared once it attained "H" level.

FIG. 9B is a timing chart showing an example in which only the WRX pulse generated when the specific area (for example, the address of the interrupt vector) within the RAM(S) is written and counted by counter 28. Reset of counter 28 by the output WRCL from AND gate 53 and the output of the signal Cen from counter 28 are the same as in the example of FIG. 9A.

Because of this arrangement, the RAM(S) area is not shifted even when the RAM area shift enable bit 6 is simply set to "1" without performing the process of S10 (that is, the data of flash memory (C) area are not transferred to RAM(S) area of the flow chart shown in FIG. 7). The process of setting "1" to the RAM area shift enable bit 6 is valid only when a prescribed number of writings to the above described specific area within the RAM(S) area are performed successively, and the RAM(S) area is shifted.

As described above, in the microcomputer in accordance with the third embodiment, shifting of the RAM(S) area does not occur unless the data of the specific area of the flash memory (for example, the specific area including the interrupt vector storing area, for example) are transferred to the RAM(S) area. Therefore, even if "1" should erroneously or accidentally be written to RAM area shift enable bit 6 because of a program error or the like, malfunction of the microcomputer can be prevented. As in the first embodiment, BGO function can be realized and the data can be protected in the RAM(S) area after shifting in the microcomputer in accordance with the third embodiment.

Fourth Embodiment

In the first to third embodiments above, one RAM(S) area is shifted to one shift destination. These areas may be provided in plural, respectively. In such a case, a plurality of RAM area shift enable bits 6 are necessary. The fourth embodiment is an example.

Figure 10:
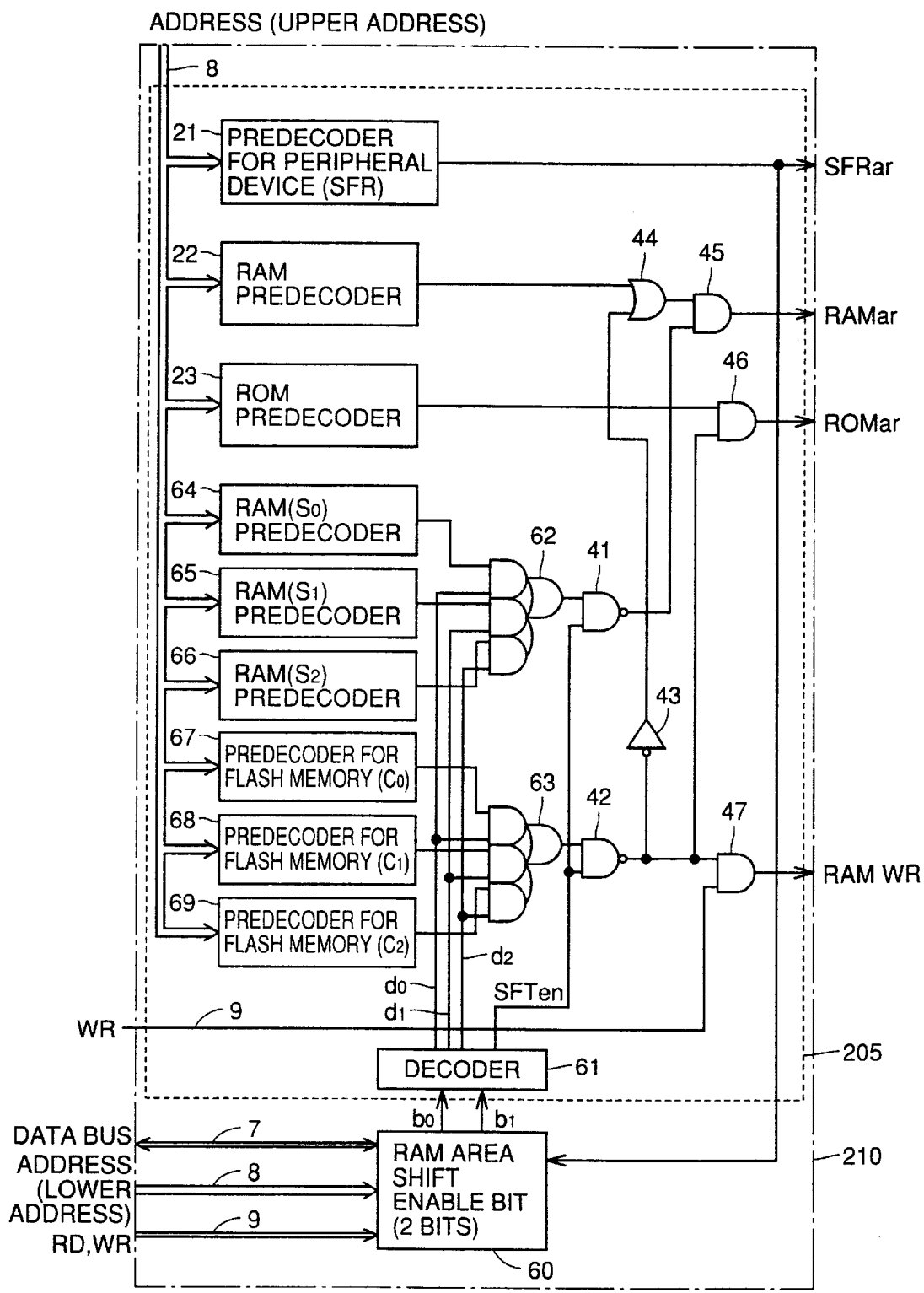
FIG. 10 is a block diagram of an address predecoder and related portions of the microcomputer in accordance with a third embodiment.
Figure 11A:
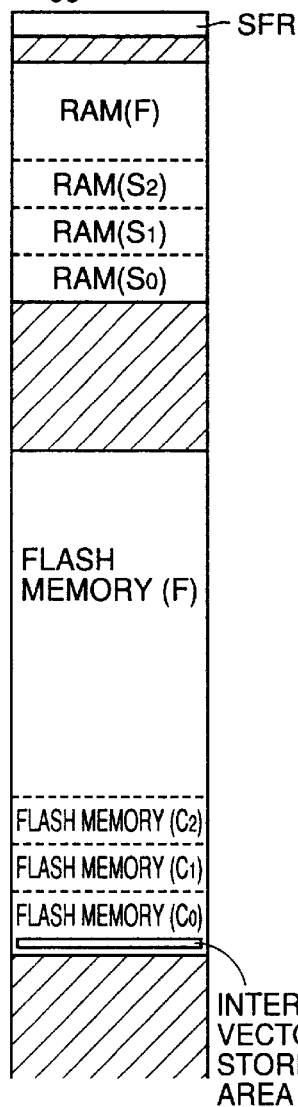
FIGS. 11A to 11D show memory mappings of the microcomputer in accordance with the third embodiment.
Figure 11B:
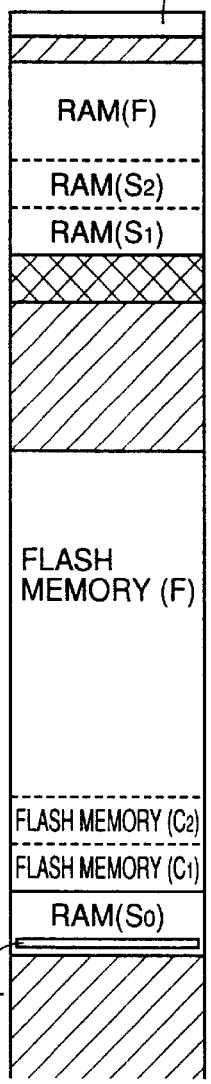
Figure 11C:
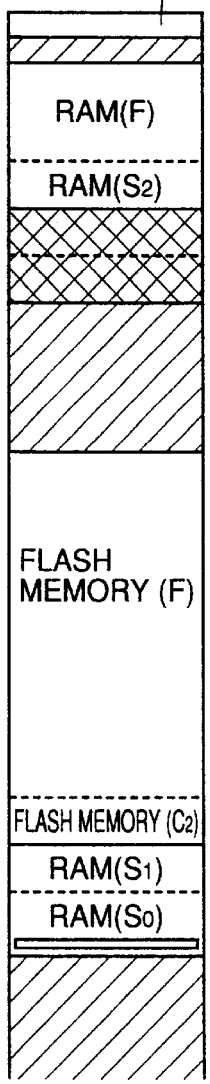
Figure 11D:
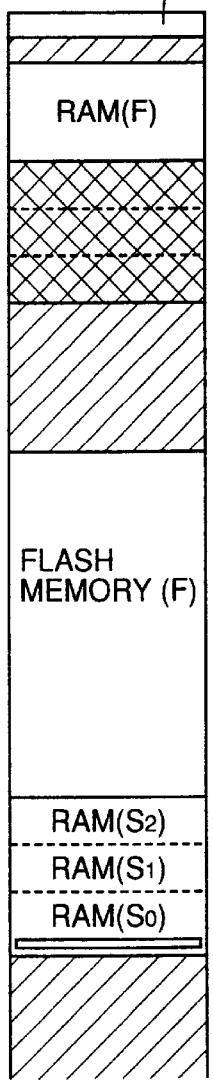

Referring to FIG. 10, predecoder 210 with RAM area shift function of the microcomputer in accordance with the fourth embodiment includes: RAM area shift enable bit 60 consisting of two bits, that is, b0 and b1, and an address predecoder 205 connected to address bus 8 and RAM area shift enable bits 60 for independently implementing the functions realized by the first to third embodiments described above on the plurality of areas based on the RAM area shift enable bits 60. In the following description, it is assumed that RAM(S) areas 1 to 3 and flash memory (C) areas 1 to 3 are used, which will be denoted by RAM (S1) to RAM (S3) and flash memory (C1) to flash memory (C3) areas.

In addition to predecoder 21 for the peripheral device, RAM predecoder 22 and ROM predecoder 23, NAND gates 41 and 42, inverting circuit 43, OR gate 44, and AND gates 45, 46 and 47, address predecoder 205 includes an RAM (S0) predecoder 54, an RAM (S1) predecoder 65, an RAM (S2) predecoder 66, a flash memory (C0) predecoder 67, a flash memory (C1) predecoder 68 and a flash memory (C2) predecoder 68. Functions of predecoders 64 to 69 are similar to those of RAM(S) predecoder 24 and flash memory (C) predecoder 25. The only difference is that the decoders are provided for respective specific areas, as there are a plurality of object areas.

Address predecoder 205 further includes: a decoder 61 receiving and decoding bits b0 and b1 from RAM area shift enable bit 60 and outputting control signals d0 to d2 for controlling various portions of address predecoder 205 and the signal SFTen; a composite gate 62 having a selecting function, receiving outputs d0 to d2 of decoder 61 and outputs of predecoders 64 to 66; and a composite gate 63 having a selecting function, receiving outputs d0 to d2 of decoder 61 and the outputs of predecoders 67 to 69. Composite gate 62 has a function of selecting any of the outputs of RAM (S0) predecoder 64 to RAM (S2) predecoder 66, in accordance with the outputs d0 to d2 of decoder 61. Composite gate 62 has an output coupled to an input of NAND gate 41. Composite gate 63 has a function of selecting any of the outputs of flash memory (C0) predecoder 67 to flash memory (C2) predecoder 69 in accordance with the outputs d0 to d2 of decoder 61. Composite gate 63 has an output coupled to an input of NAND gate 42. The signal SFTen output from decoder 61 is coupled to the other input of NAND gate 41 and of NAND gate 42. By this structure, shift control is performed in the similar manner as in the first embodiment.

Table 2 is a truth table of decoder 61.

TABLE 2

| b1 | b0 | d2 | d1 | d0 | SFTen | |
|----|----|----|----|----|-------|---|
| 0  | 0  | 0  | 0  | 0  | 0     | (after reset) |
| 0  | 1  | 0  | 0  | 1  | 1     | |
| 1  | 0  | 0  | 1  | 1  | 1     | |
| 1  | 1  | 1  | 1  | 1  | 1     | |

FIGS. 11A to 11D show memory mappings implemented by the fourth embodiment. In the fourth embodiment, three areas, that is, RAM (S0) to RAM (S2) are shifted successively to flash memory (C0) to flash memory (C2) areas in accordance with the outputs from decoder 61.

Because of this structure, it becomes possible to select the capacity of the RAM(S) area in a flexible manner, in accordance with the size of a control program for the BGO process, which may differ dependent on the product on which the microcomputer is used.

By slightly changing a part of the circuit shown in FIG. 10 and the truth table of decoder 61, memory mappings such as shown in FIGS. 12A to 12D can also be implemented. In the memory mappings of FIGS. 12A to 12D, three areas, that is, RAM (S0) to RAM (S2) are shifted to one flash memory (C) area in accordance with the outputs of decoder 61.

In such memory mappings, by successively transferring (copying) the data in the flash memory (C) area to the three areas of RAM (S0) to RAM (S2) and overwriting some of the programs in these three areas RAM (S0) to RAM (S2) thereafter, three different BGO process programs can be prepared. By shifting an arbitrary one of three areas RAM (S0) to RAM (S2) onto the flash memory (C) area, it is possible to utilize any of these three BGO process programs. Therefore, it becomes possible to select and execute an optimal BGO process dependent on what time point of the original process routine of the CPU and/or under what condition the flash memory is to be overwritten by the BGO. It should be noted that the necessary process for this purpose is simply to overwrite the RAM area shift enable bit 60 so as to select a desired one of the three areas RAM (S0) to RAM (S2). Therefore, the BGO process can be performed efficiently.

In this embodiment also, as in the first embodiment, the BGO function can be realized and the data in the RAM(S) after shifting are protected, in the fourth embodiment.

Fifth Embodiment

The RAM(S) area before shifting in the first embodiment, for example, is essentially inaccessible. There may be a possibility that an attempt is made to access this area, because of a program error or the like.

In the first embodiment, even if there is such an attempt to that area, actual writing is not performed as the RAM write control signal RAM WR is not generated, and hence the data in this area is protected. In the process of a program development, however, it is necessary to analyze the cause of such an erroneous access and to solve the problem. In the first embodiment, writing is simply neglected and occurrence of such an erroneous access cannot be known externally.

The microcomputer in accordance with the fifth embodiment is adapted such that the microcomputer can externally give a notice of such an error.

Figure 13:
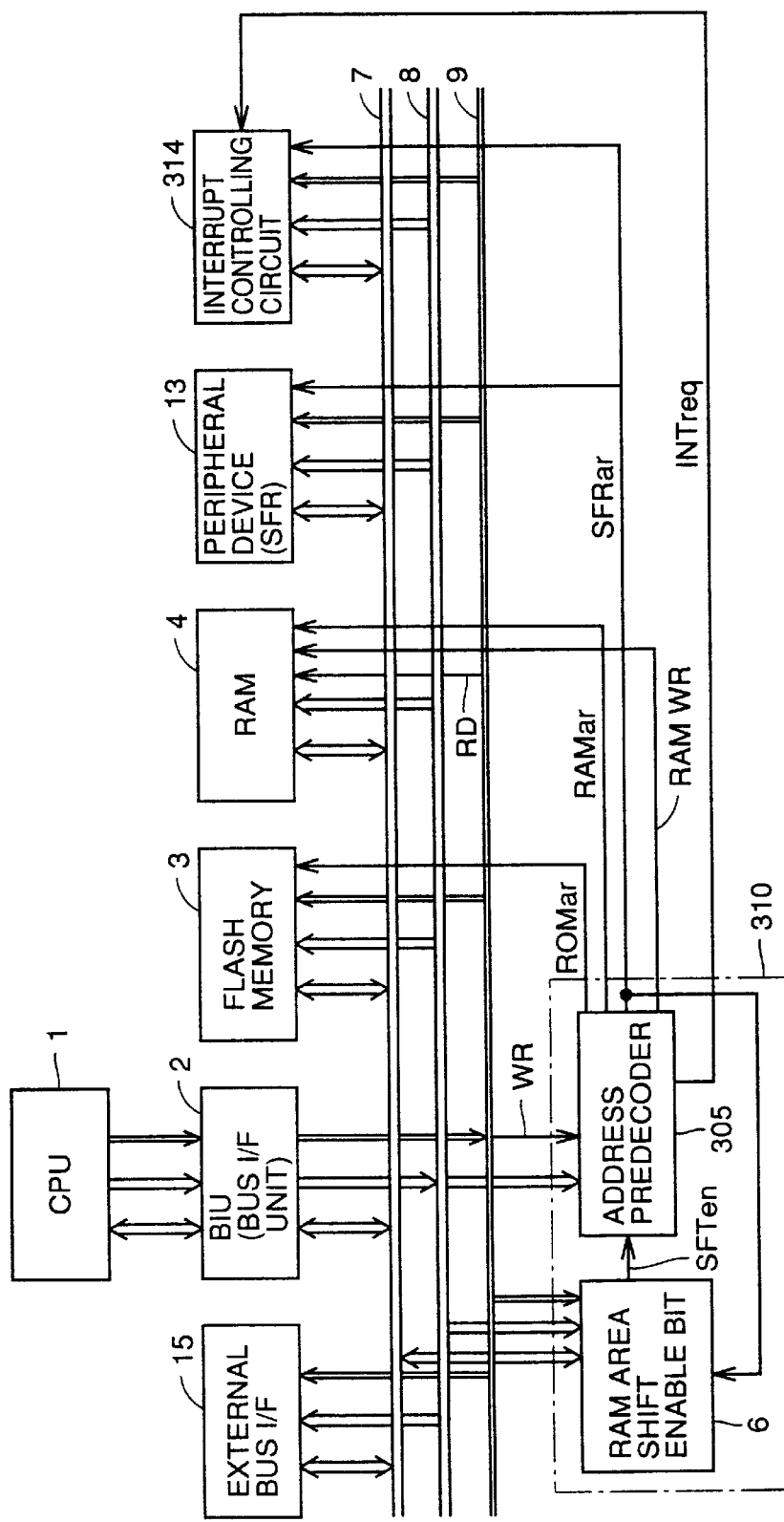
FIG. 13 is a block diagram of a microcomputer in accordance with the fourth embodiment.

Referring to FIG. 13, the microcomputer in accordance with the fifth embodiment includes, in place of predecoder 10 with RAM area shift function of the microcomputer shown in FIG. 4, a predecoder 310 with RAM area shift function, which is basically similar to predecoder 10 with RAM area shift function but additionally has a function of outputting, when there is an attempt to access the RAM(S) area before shifting, an interrupt signal pulse INTreq at the same timing, and in place of interrupt controlling circuit 14 of the microcomputer shown in FIG. 4, an interrupt controlling circuit 314 which is basically similar to interrupt controlling circuit 14 but additionally has a function of activating an interrupt process upon reception of the interrupt signal pulse INTreq.

Figure 14:
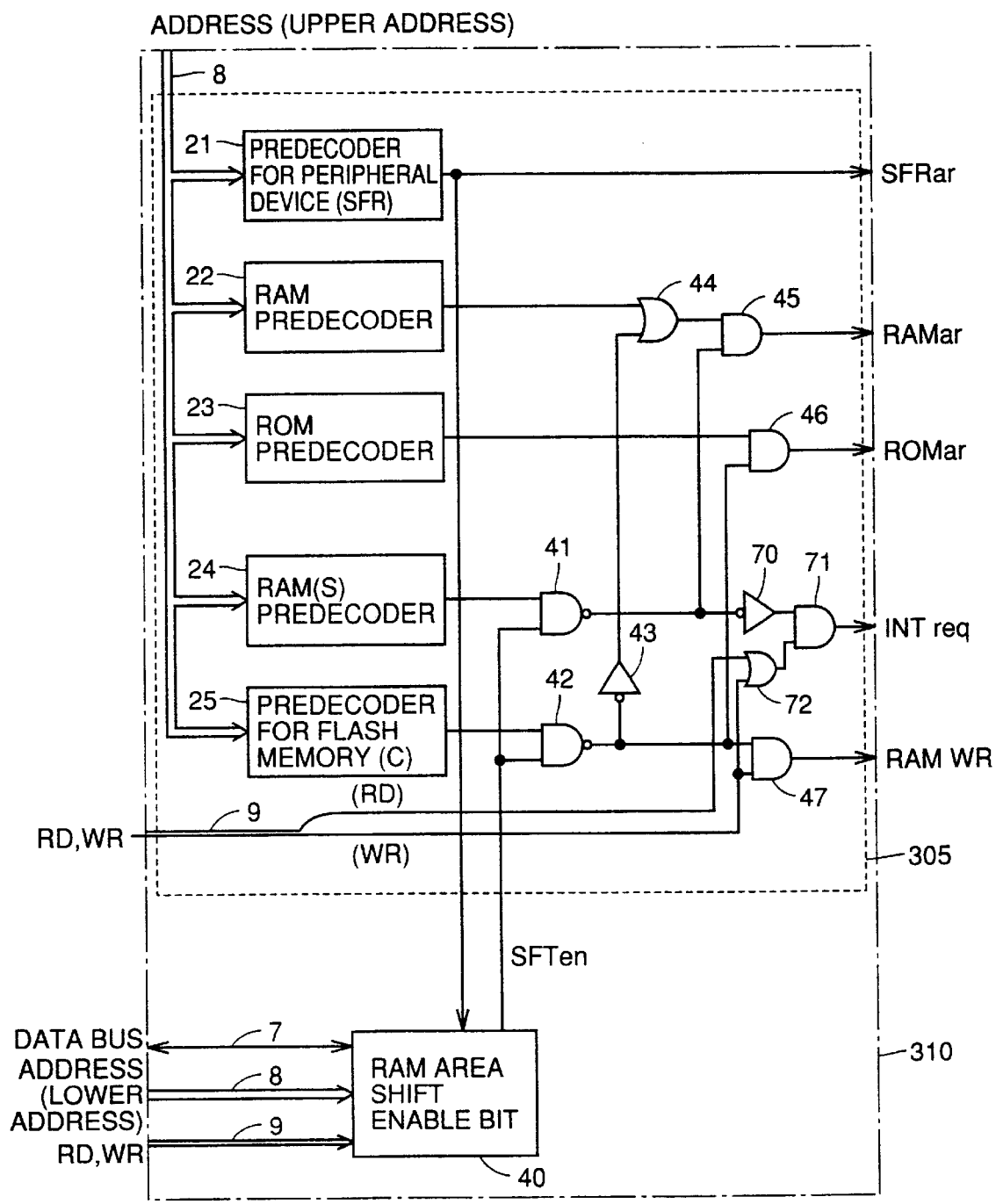
FIG. 14 is a block diagram of an address predecoder and related portions of the microcomputer in accordance with the fourth embodiment.

Referring to FIG. 14, predecoder 310 having RAM area shift function includes an RAM area shift enable bit 40, and an address predecoder 305 having similar structure as address predecoder 5 shown in FIG. 5 but additionally having a function of generating interrupt signal pulse INTreq when there is an attempt to access the RAM(S) area before shifting.

Address predecoder 305, which has almost the same structure as address predecoder 5, additionally includes an inverting circuit 70 receiving an output of NAND gate 41, an OR gate 72 having two inputs receiving read control signal RD and write control signal WR from RD/WR signal line 9, and an AND gate 71 receiving outputs of inverting circuit 70 and of OR gate 72. An output of AND gate 71 is the interrupt signal pulse INTreq.

In the address predecoder 305, when the RAM area shift enable bit 40 is at the state of "1" and there is an attempt to access (both read and write) the RAM(S) area before shifting, that is, an address within the inaccessible area (see FIG. 6B) after shifting, the output of AND gate 71 is rendered active, and the interrupt signal pulse INTreq is output and applied to interrupt controlling circuit 314.

Therefore, after S12 of the flow chart shown in FIG. 7, if an address corresponding to the RAM(S) area before shifting which is essentially inaccessible is erroneously accessed by a program error, for example, an interrupt occurs. In the interrupt process, it is possible for the program developer to know that an access to an inaccessible area is made, and hence the program developer can find a program error. Accordingly, appropriate counter measures such as a necessary modification of the program can surely be taken at an early stage.

As in the first embodiment, the BGO function can be implemented and the data in the RAM(S) after shifting can be protected in the fifth embodiment.

Sixth Embodiment

The flash memory (F) area after shifting is not readable, either. There may possibly be an attempt to read from the area because of a program error. The sixth embodiment realizes a function of giving a notice to the program developer, when an inappropriate read access is made to the flash memory (F) area.

Figure 15:
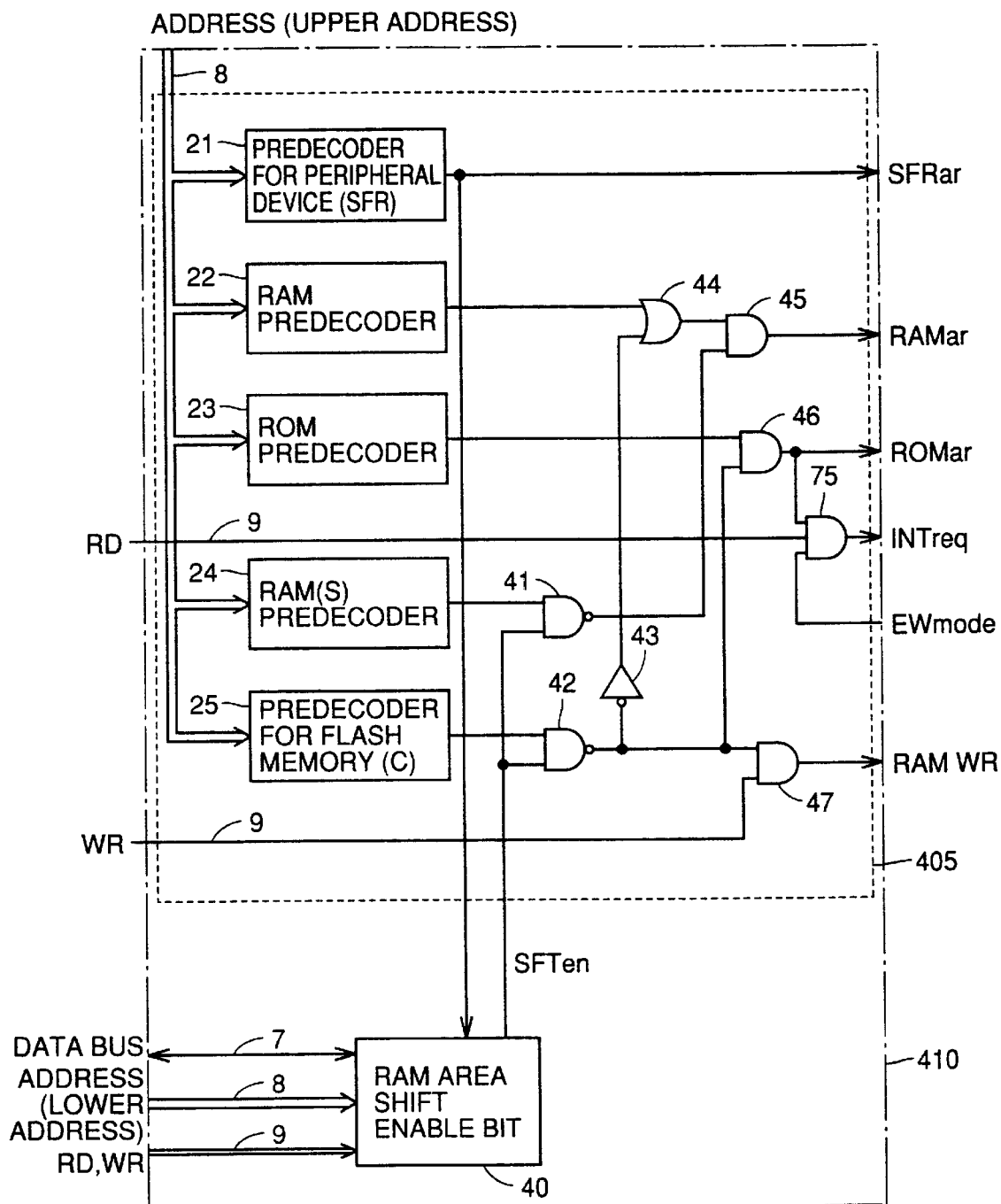
FIG. 15 is a block diagram of an address predecoder and related portions of the microcomputer in accordance with the fifth embodiment.

Referring to FIG. 15, a predecoder 410 with RAM area shift function in accordance with the sixth embodiment may be used in place of predecoder 310 with RAM area shift function in accordance with the fifth embodiment. Predecoder 410 with RAM area shift function includes an RAM area shift enable bit 40 and an address predecoder 405 which has, in addition to the function of address predecoder 5 of the first embodiment, a function of outputting an interrupt signal pulse INTreq when an inappropriate read access is made to the flash memory (F).

The structure of address predecoder 405 is similar to the address predecoder 5 in accordance with the first embodiment shown schematically in FIG. 5, except that it receives the read control signal RD from RD/WR signal line 9 as an input, and that it additionally includes a 3-input AND gate 75 receiving an output of AND gate 46, the read control signal RD and a signal EWmode designating the flash memory overwriting mode. An output of 3-input AND gate 75 is the interrupt signal pulse INTreq. The flash memory overwriting mode signal EMmode corresponds to the "mode selection bit" described in the first embodiment.

In the predecoder 410 with RAM area shift function, when a read from the flash memory (F) area takes place in the flash memory overwriting mode (flash memory overwriting mode signal EMmode is at the "H" level), the interrupt signal pulse INTreq is output from 3-input AND gate 75, and applied to interrupt controlling circuit 314 which is similar to that shown in FIG. 13.

Therefore, when a read from the flash memory (F) area, which is essentially unreadable, occurs by a program error or the like in S20 of the flow chart shown in FIG. 7, an interruption occurs. By an interruption process by the CPU 1, occurrence of this access is noticed to the program developer. Receiving this notice, the program developer can take a necessary measures such as program modification at an earlier stage.

As described above, according to the present invention, it is possible to execute a process in accordance with the data stored in the flash memory while overwriting the flash memory. At this time, even when an interruption occurs, it can be processed in the usual manner by using the RAM. Therefore, it is unnecessary to change the program structure, and therefore the BGO function can be implemented while suppressing increase in cost.

Further, as the access enable modes for respective areas are appropriately controlled, the destruction of data can be prevented. Therefore, a microcomputer including a flash memory which operates with high reliability can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microcomputer including a flash memory, comprising:

a central processing unit;

a plurality of storage devices coupled to said central processing unit, including a flash memory, the plurality of storage devices having an address designated by the central processing unit independently from each other; and an address predecoder connected to receive an address signal from said central processing unit, the address predecoder configured to switch between a first memory mapping and a second memory mapping, and to control an access enable mode to a specific area of said flash memory, wherein said address predecoder is further configured to switch in accordance with memory mapping designating information designating said first memory mapping or said second memory mapping in which addresses of at least a prescribed area of said plurality of storage devices different from said flash memory are remapped to a specific area of said flash memory.

2. The microcomputer including a flash memory according to claim 1, wherein said address predecoder includes a storage unit storing said memory mapping designating information;

a predecoder for an upper address, connected to receive an upper address of said address signal from said central processing unit, configured to decode said upper address of said address signal and to output selection signals for said plurality of storage devices, said prescribed area of said plurality of storage devices, and said specific area of said flash memory, respectively; and a logic circuit connected to receive said selection signals output from said predecoder for the upper address and said memory mapping designating information, and configured to enable replacement of selection signals for said prescribed area with the selection signal for said specific area, dependent on a value of said memory mapping designating information.

3. The microcomputer including a flash memory according to claim 2, wherein said logic circuit includes a first AND gate connected to receive the selection signal for said specific area and said memory mapping designating information, a second AND gate connected to receive the selection signal for said prescribed area and said memory mapping designating information, an OR gate connected to receive an output of said first AND gate and the selection signal for that one of said plurality of storage devices which includes said prescribed area, a third AND gate connected to receive an output of said OR gate and an inversion of an output of said second AND gate, and a fourth AND gate connected to receive an inversion of an output of said first AND gate and the selection signal for said flash memory.

4. The microcomputer including a flash memory according to claim 3, wherein said address predecoder further includes a fifth AND gate connected to receive a write control signal and an inversion of an output of said first AND gate.

5. The microcomputer including a flash memory according to claim 4, wherein said specific area includes an interrupt vector.

6. The microcomputer including a flash memory according to claim 2, wherein said prescribed area includes a plurality of separate areas;

said specific area of said flash memory includes a plurality of separate specific areas corresponding to said plurality of separate areas; and said predecoder for the upper address includes a plurality of predecoders for the plurality of storage devices respectively connected to receive upper bits of said address, and configured to decode the upper bits of said address and to output selection signals for selecting any of said plurality of storage devices, said plurality of separate areas and said plurality of separate specific areas, and a composite gate connected to receive said memory mapping designating information, and configured to gate a prescribed combination of selection signals for said plurality of separate areas and a prescribed combination of selection signals for said plurality of separate specific areas, in accordance with said memory mapping designating information.

7. The microcomputer including a flash memory according to claim 6, wherein said composite gate selects any one of the selection signals for said plurality of separate areas and any one of the selection signals for said plurality of separate specific areas, in accordance with said memory mapping designating information.

8. The microcomputer including a flash memory according to claim 6, wherein said composite gate is configured to gate a different number of said selection signals in accordance with said memory mapping designating information.

9. The microcomputer including a flash memory according to claim 2, wherein said address predecoder further includes a logic circuit connected to receive the selection signal for said prescribed area, an access control signal for said plurality of storage devices, and said memory mapping designating information, and configured to respond to said memory mapping designating information designating said second memory mapping, an active selection signal for said prescribed area and active said access control signal, and to output an interrupt signal.

10. A microcomputer including a flash memory according to claim 2, wherein said address predecoder further includes a logic circuit connected to receive the selection signal for said specific area, a read control signal for said plurality of storage devices, and said memory mapping designating information, and configured to respond to said memory mapping designating information designating said second memory mapping, an active selection signal for said specific area and active said read control signal, and to output an interrupt signal.

11. A microcomputer including a flash memory according to claim 1, wherein said address predecoder includes a storage unit storing said memory mapping designating information, a predecoder for an upper address connected to receive upper bits of said address signal from said central processing unit, and configured to decode said upper bits of said address signal and output a selection signal or a non-selection signal for said plurality of storage devices, for said prescribed area of said plurality of storage devices, and for said specific area of said flash memory, a counter connected to receive the upper bit of said address signal and a write control signal, and configured to count a number of continuous writing to a predetermined area within said prescribed area, and to provide an active output when the number of continuous writing exceeds a prescribed threshold value, an AND gate connected to receive an output of said counter and said memory mapping designating information, and a logic circuit connected to receive said selection signal and said non-selection signal output from the predecoder for the upper address and output of said AND gate, and adapted to replace the selection signal for said specific area with the selection signal for said prescribed area, in accordance with the value of the output of said AND gate.

12. The microcomputer including a flash memory according to claim 11, wherein said logic circuit includes a first AND gate connected to receive the selection signal for said specific area and the output of said AND gate, a second AND gate connected to receive the selection signal for said prescribed area and the output of said AND gate, an OR gate connected to receive an output of said first AND gate and the selection signal for that one of said plurality of storage devices which includes said prescribed area, a third AND gate connected to receive an output of said OR gate and an inversion of an output of said second AND gate, and a fourth AND gate connected to receive an inversion of the output of said first AND gate and the selection signal for said flash memory.

13. The microcomputer including a flash memory according to claim 1, wherein said address predecoder includes a storing unit storing said memory mapping designating information, a predecoder for an upper address connected to receive upper bits of said address signal from said central processing unit, and configured to decode said upper bits of said address signal for outputting a selection signal or a non-selection signal respectively for said plurality of storage devices, for said prescribed area of said plurality of storage devices, and for said specific area of said flash memory, a counter connected to receive the upper bits of said address signal and a write control signal, configured to count a number of reading from a predetermined area in said specific area and number of continuous writing to a predetermined area in said prescribed area, and to provide an active output when the number of continuous read and write exceeds a prescribed threshold value, an AND gate connected to receive an output of said counter and said memory mapping designating information, and a logic circuit connected to receive said selection signal and said non-selection signal output from the predecoder for the upper address, and an output of said AND gate, and adapted to enable replacement of the selection signal for said specific area with the selection signal for said prescribed area in accordance with a value of the output of said AND gate.

14. The microcomputer including a flash memory according to claim 13, wherein said logic circuit includes a first AND gate connected to receive the selection signal for said specific area and the output of said AND gate, a second AND gate connected to receive the selection signal for said prescribed area and the output of said AND gate, an OR gate connected to receive an output of said first AND gate and the selection signal for that one of said plurality of storage devices which includes said prescribed area, a third AND gate connected to receive an output of said OR gate and an inversion of an output of said second AND gate, and a fourth AND gate connected to receive an inversion of an output of said first AND gate and the selection signal for said flash memory.

15. A method of operating a microcomputer including a flash memory, comprising the steps of:

transferring data of a first specific area of the flash memory to a first prescribed area of another storage device;

remapping addresses of said first prescribed area to said first specific area;

transferring data of a second specific area of the flash memory as needed to a second prescribed area of another storage device; and remapping, after the data of said second specific area are transferred, addresses of said second prescribed area to said second specific area.

16. A method of operating a microcomputer including a flash memory, comprising the steps of:

transferring data of a first specific area of a flash memory to first and second prescribed areas of another storage device;

updating the data transferred to said first and second prescribed areas with mutually different data; and remapping addresses of said first prescribed area or said second prescribed area to said first specific area, in accordance with a condition of operation of the microcomputer including a flash memory.

* * * * *